US012803844B2

(12) United States Patent
Namgoong et al.

(10) Patent No.: US 12,803,844 B2
(45) Date of Patent: Nov. 17, 2026

(54) PERMUTATION-EQUIVARIANT NEURAL CHANNEL CODING CONSTRUCTION

(71) Applicant: QUALCOMM Incorporated, San Diego, CA (US)

(72) Inventors: June Namgoong, San Diego, CA (US); Akash Sandeep Doshi, San Diego, CA (US); Wei Yang, San Diego, CA (US); Kirill Ivanov, La Jolla, CA (US); Pinar Sen, San Diego, CA (US); Jing Jiang, San Diego, CA (US); Danlu Zhang, San Diego, CA (US); Taesang Yoo, San Diego, CA (US); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 323 days.

(21) Appl. No.: 18/616,945

(22) Filed: Mar. 26, 2024

(65) Prior Publication Data

US 2025/0310156 A1 Oct. 2, 2025

(51) Int. Cl.
*H04L 25/02* (2006.01)
*H04L 5/00* (2006.01)
*H04W 52/18* (2009.01)

(52) U.S. Cl.
CPC ........ *H04L 25/0254* (2013.01); *H04L 5/0044* (2013.01); *H04W 52/18* (2013.01)

(58) Field of Classification Search
CPC ... H04L 25/0254; H04L 5/0044; H04W 52/18
USPC ........................................................ 375/262
See application file for complete search history.

(56) References Cited

U.S. PATENT DOCUMENTS

| | | | | |
|---|---|---|---|---|
| 12,647,160 | B2 * | 6/2026 | Namgoong | H04B 7/0482 |
| 2010/0011041 | A1 * | 1/2010 | Vannucci | G06F 17/12 708/607 |
| 2023/0077692 | A1 * | 3/2023 | Onoro-Rubio | G06N 3/0455 706/25 |
| 2023/0178199 | A1 * | 6/2023 | Soltani | G16H 50/20 705/3 |
| 2024/0104392 | A1 * | 3/2024 | Ye | G06N 3/098 |
| 2024/0256864 | A1 * | 8/2024 | Jamali | G06N 3/08 |

* cited by examiner

*Primary Examiner* — Michael R Neff
(74) *Attorney, Agent, or Firm* — Harrity & Harrity LLP

(57) ABSTRACT

Various aspects of the present disclosure generally relate to wireless communication. Some aspects relate to artificial intelligence or machine learning (AI/ML) based channel coding, in which an AI/ML model is used to encode and/or modulate a message for transmission. Aspects described herein use an artificial neural network (ANN) which may include a number of self-attention layers. For example, the ANN may consist of self-attention layers. An ANN that includes only self-attention layers may be associated with a lower number of model parameters than other ANNs, such as ANNs that incorporate a set of transformer layers. Furthermore, the number of model parameters that define an ANN may be lower than a number of table parameters that define a codebook for a transformer-based ANN for channel coding. Thus, signaling overhead can be reduced.

20 Claims, 10 Drawing Sheets

PERMUTATION-EQUIVARIANT NEURAL CHANNEL CODING CONSTRUCTION

FIELD OF THE DISCLOSURE

Aspects of the present disclosure generally relate to wireless communication and specifically relate to techniques, apparatuses, and methods associated with permutation-equivariant neural channel coding construction.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

A communication system (such as NR, 6G, WiFi, or Ethernet) may use channel coding for communications such as wireless communications. "Channel coding" generally refers to encoding an input message, such as a data message, to generate an output codeword. Different types of channel coding may provide different benefits, such as data compression or error control. In some examples, channel coding may be performed using an artificial intelligence or machine learning (AI/ML) model.

Many AI/ML channel codes are non-linear. Linearity/non-linearity is a property that generally relates to the structure of a code such as a channel code. In particular, a linear code may be defined over a finite field $\Sigma$. A code C is linear if the code C, for n uses of the channel ($\Sigma^n$), is a subspace of $\Sigma^n$ (in other words, $C \subset \Sigma^n$). Thus, any codeword of the code C can be expressed as a linear combination of basis vectors of the subspace C, where the rows of a generator matrix of dimension k×n (where k is the dimension of the subspace) comprise the basis vectors for the code C, and where any linear combination of codewords is also a codeword. Thus, in a linear code, the generator matrix may provide structured encoding. In practical terms, a linear code has structure that can be exploited at the receiver/decoder to provide efficient decoding. Linear codes may also be associated with an equal error probability for each codeword/payload as a property of linearity.

Many non-linear codes may not have such structure, and may not have equal error probability for each codeword/payload. Thus, non-linear codes present certain challenges at the receiver. In particular, in the codebook for a non-linear code (that is, the set of codewords belonging to the nonlinear code), the mapping of messages to the corresponding codewords can be arbitrary. Thus, identifying structure of the codebook may be difficult, or no structure may be present or exploitable in the codebook. This may lead to a situation where the entire codebook and message-to-codeword mapping is explicitly defined (rather than defining, for example, in terms of a structural representation such as a generator matrix), which reduces efficiency of encoding and decoding.

SUMMARY

Some aspects described herein relate to a method of wireless communication performed by a wireless communication device. The method may include obtaining a message vector. The method may include generating a set of message sub-vectors using the message vector. The method may include generating a set of message embedding vectors corresponding to the set of message sub-vectors. The method may include generating, using a set of self-attention layers of an artificial neural network, a set of codeword embedding vectors corresponding to the set of message embedding vectors. The method may include generating, using the set of codeword embedding vectors, a set of codeword sub-vectors, wherein the set of codeword sub-vectors is permutation equivariant relative to the set of message sub-vectors. The method may include combining the set of codeword sub-vectors to generate a codeword vector. The method may include transmitting a communication carrying the codeword vector.

Some aspects described herein relate to a wireless communication device. The wireless communication device may include one or more memories storing processor readable code and one or more processors coupled with the one or more memories. The one or more processors may be individually or collectively operable to cause the wireless communication device to obtain a message vector. The one or more processors may be individually or collectively operable to cause the wireless communication device to generate a set of message sub-vectors using the message vector. The one or more processors may be individually or collectively operable to cause the wireless communication device to generate a set of message embedding vectors corresponding to the set of message sub-vectors. The one or more processors may be individually or collectively operable to cause the wireless communication device to generate, using a set of self-attention layers of an artificial neural network, a set of codeword embedding vectors corresponding to the set of message embedding vectors. The one or more processors may be individually or collectively operable to cause the wireless communication device to generate, using the set of codeword embedding vectors, a set of codeword sub-vectors, wherein the set of codeword sub-vectors is permutation equivariant relative to the set of message sub-vectors. The one or more processors may be individually or collectively operable to cause the wireless communication device to combine the set of codeword sub-vectors to generate a codeword vector. The one or more processors may be individually or collectively operable to cause the wireless communication device to transmit a communication carrying the codeword vector.

Some aspects described herein relate to a non-transitory computer-readable medium that stores a set of instructions for wireless communication by a wireless communication device. The set of instructions, when executed by one or more processors of the wireless communication device, may cause the wireless communication device to obtain a message vector. The set of instructions, when executed by one or more processors of the wireless communication device, may cause the wireless communication device to generate a set of message sub-vectors using the message vector. The set of instructions, when executed by one or more processors of the wireless communication device, may cause the wireless communication device to generate a set of message embedding vectors corresponding to the set of message sub-vectors. The set of instructions, when executed by one or more processors of the wireless communication device, may cause the wireless communication device to generate, using a set of self-attention layers of an artificial neural network, a set of codeword embedding vectors corresponding to the set of message embedding vectors. The set of instructions, when executed by one or more processors of the wireless communication device, may cause the wireless communication device to generate, using the set of codeword embedding vectors, a set of codeword sub-vectors, wherein the set of codeword sub-vectors is permutation equivariant relative to the set of message sub-vectors. The set of instructions, when executed by one or more processors of the wireless communication device, may cause the wireless communication device to combine the set of codeword sub-vectors to generate a codeword vector. The set of instructions, when executed by one or more processors of the wireless communication device, may cause the wireless communication device to transmit a communication carrying the codeword vector.

Some aspects described herein relate to an apparatus for wireless communication. The apparatus may include means for obtaining a message vector. The apparatus may include means for generating a set of message sub-vectors using the message vector. The apparatus may include means for generating a set of message embedding vectors corresponding to the set of message sub-vectors. The apparatus may include means for generating, using a set of self-attention layers of an artificial neural network, a set of codeword embedding vectors corresponding to the set of message embedding vectors. The apparatus may include means for generating, using the set of codeword embedding vectors, a set of codeword sub-vectors, wherein the set of codeword sub-vectors is permutation equivariant relative to the set of message sub-vectors. The apparatus may include means for combining the set of codeword sub-vectors to generate a codeword vector. The apparatus may include means for transmitting a communication carrying the codeword vector.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
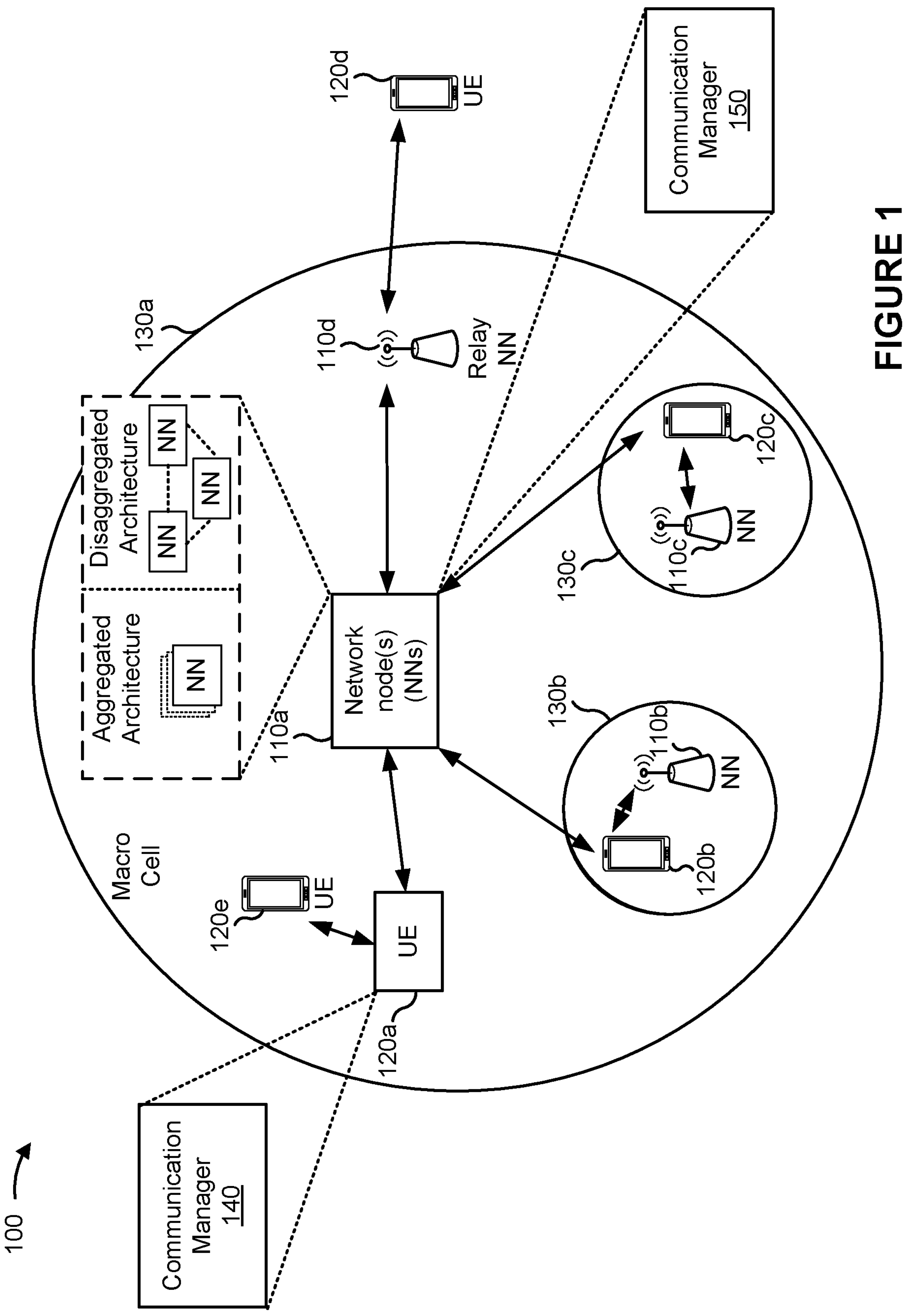
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Channel coding may provide various benefits in a wireless communication system, such as error correction, power reduction, or improved reliability. A channel code can be implemented as a mapping between input values (referred to as message vectors) and output values (referred to as codewords or codeword vectors). For example, a transmitter may obtain a message vector and may refer to a table that indicates the message vector and a corresponding codeword vector. Alternatively, channel coding can be performed using an algorithm or model. The transmitter may transmit a communication carrying or otherwise based on the codeword vector.

An artificial intelligence or machine learning (AI/ML) model may be used to perform channel coding. For example, the AI/ML model may receive a message vector as input and may output a corresponding codeword. As another example, the AI/ML model may define mappings between message vectors and corresponding codeword vectors, such that a table can be defined according to these mappings. Some implementations of AI/ML based channel code may provide performance advantages over some other forms of channel code, such as in terms of throughput, energy efficiency, or processing overhead.

Many AI/ML channel codes are non-linear. Linearity/non-linearity is a property that generally relates to the structure of a code such as a channel code. In particular, a linear code may be defined over a finite field $\Sigma$. A code C is linear if the code C, for n uses of the channel ($\Sigma^n$), is a subspace of $\Sigma^n$ (in other words, $C \subset \Sigma^n$). Thus, any codeword of the code C can be expressed as a linear combination of basis vectors of the subspace C, where the rows of a generator matrix of dimension k×n (where k is the dimension of the subspace) comprise the basis vectors for the code C, and where any linear combination of codewords is also a codeword. Thus, in a linear code, the generator matrix may provide structured encoding. In practical terms, a linear code may have structure that can be exploited at the receiver/decoder to provide efficient decoding. Linear codes may also be associated with an equal error probability for each codeword/payload as a property of linearity.

Many non-linear codes may not have such structure, and may not have equal error probability for each codeword/payload. Thus, non-linear codes present certain challenges at the receiver. In particular, in the codebook for a non-linear code (that is, the set of codewords belonging to the nonlinear code), the mapping of messages to the corresponding codewords can be arbitrary. Thus, identifying structure of the codebook may be difficult, or no structure may be present or exploitable in the codebook. This may lead to a situation where the entire codebook and message-to-codeword mapping is explicitly defined (rather than defining, for example, in terms of a structural representation such as a generator matrix), which reduces efficiency of encoding and decoding.

Various aspects relate generally to AI/ML-based channel coding. Some aspects more specifically relate to implementation of an artificial neural network (ANN) in which an encoder block of the ANN incorporates only self-attention layers for an AI/ML channel code. This may provide structure in the channel code's codebook, which may simplify decoding of a codeword encoded using the ANN, despite the channel code being a non-linear code. For example, this structure may be a result of a permutation equivariance property of the ANN. In some aspects, a transmitter may obtain a message vector, and may generate a set of message sub-vectors using the message vector. The transmitter may generate a set of codeword sub-vectors using the set of message sub-vectors. The set of codeword sub-vectors may be permutation-equivariant relative to the set of message sub-vectors, meaning that any permutation of the set of message sub-vectors is carried through to the set of codeword sub-vectors. The transmitter may generate a codeword vector by combining the codeword sub-vectors, and may transmit a communication in accordance with the codeword vector.

In some aspects, the ANN may include a set of self-attention layers. For example, the ANN (such as an encoder block of the ANN) may consist of the set of self-attention layers and a set of layer normalization layers. As another example, the ANN may omit a multi-layer perceptron (MLP) layer.

In some aspects, the codeword vectors maybe normalized, for example to ensure that all resulting codeword vectors in the codebook have the same transmit power. In some other aspects, the codeword vectors may be scaled according to a scaling factor, such that different codeword vectors have different transmit powers.

Particular aspects of the subject matter described in this disclosure can be implemented to realize one or more of the following potential advantages. In some aspects, by providing permutation equivariance between the input (message sub-vectors) and the output (codeword sub-vectors), a structure is enforced in the codebook that can be exploited for simpler decoding of a codeword. For example, a table may define a codeword sub-vector corresponding to a message sub-vector in a fashion that exploits the permutation equivariance to reduce a size of the table relative to a table that explicitly defines all possible mappings of message vectors and codeword vectors. Thus, complexity of decoding of ANN-based channel codes is reduced.

In some aspects, by using a set of self-attention layers (such as only the set of self-attention layers, as opposed to using a transformer that includes a self-attention layer and an MLP), complexity of model parameters of the ANN (such as weights or biases) is reduced relative to other forms of ANN, such as ANNs including transformers. Furthermore, the number of model parameters used to define an ANN including only self-attention layers in an encoder block may be lower than a number of parameters used to define a table for an ANN including a transformer. Thus, it may be more efficient (from at least a signaling perspective) to signal the model parameters that define the ANN including only self-attention layers than to signal or pre-configure the table.

In some aspects, normalizing the codeword vectors to have the same transmit power may be appropriate when all the codewords in the codebook are equally likely. In some aspects, scaling the codeword vectors using the common scaling factor without normalizing each codeword vector may enable transmit power reduction at the transmitter, by taking advantage of the codeword distribution.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHZ), FR3 (7.125 GHz through 24.25 GHZ), FR4a or FR4-1 (52.6 GHz through 71 GHZ), FR4 (52.6 GHZ through 114.25 GHZ), and FR5 (114.25 GHz through 300 GHZ). Although a portion of FR1 is greater than 6 GHZ, FR1 is often referred to (interchangeably) as a "Sub-6 GHZ" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUS). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (IFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node **110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120** that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*c*) may communicate directly with one another using sidelink communications (for example, without communicating by way of a network node 110 as an intermediary). As an example, the UE 120*a* may directly transmit data, control information, or other signaling as a sidelink communication to the UE 120*c*. This is in contrast to, for example, the UE 120*a* first transmitting data in an UL communication to a network node 110, which then transmits the data to the UE 120*c* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, a wireless communication device such as UE 120 or network node 110 may include a communication manager 140. As described in more detail elsewhere herein, the communication manager 140 may obtain a message vector; generate a set of message sub-vectors using the message vector; generate a set of message embedding vectors corresponding to the set of message sub-vectors; generate, using a set of self-attention layers of an artificial neural network, a set of codeword embedding vectors corresponding to the set of message embedding vectors; generate, using the set of codeword embedding vectors, a set of codeword sub-vectors, wherein the set of codeword sub-vectors is permutation equivariant relative to the set of message sub-vectors; combine the set of codeword sub-vectors to generate a codeword vector; and transmit a communication carrying the codeword vector. Additionally, or alternatively, the communication manager 140 may perform one or more other operations described herein.

Figure 2:
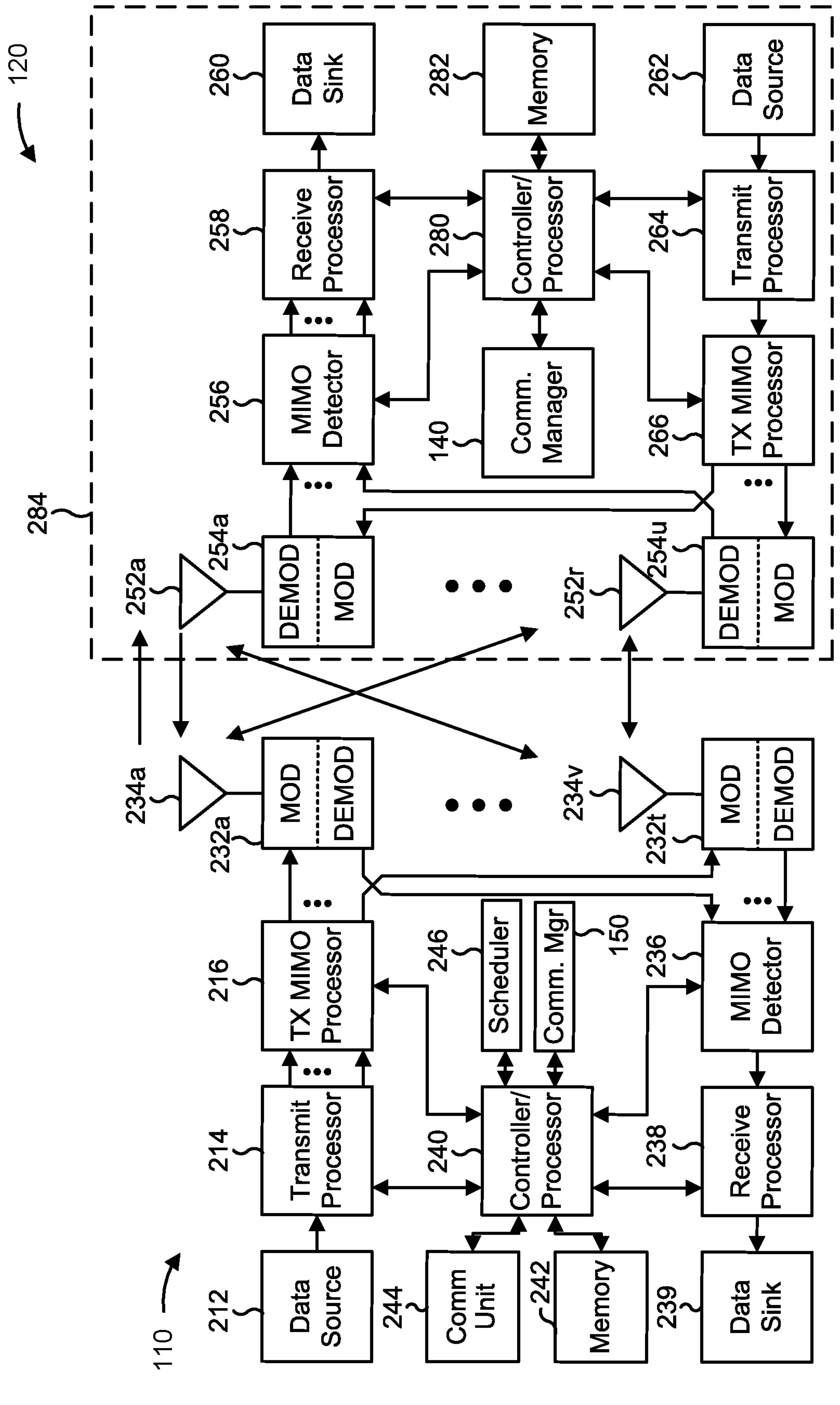
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where $t \geq 1$), a set of antennas 234 (shown as 234*a* through 234*v*, where $v \geq 1$), a MIMO detector 236, a receive processor 238, a data sink 239, a controller/processor 240, a memory 242, a communication unit 244, a scheduler 246, and/or a communication manager 140, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

Figure 3:
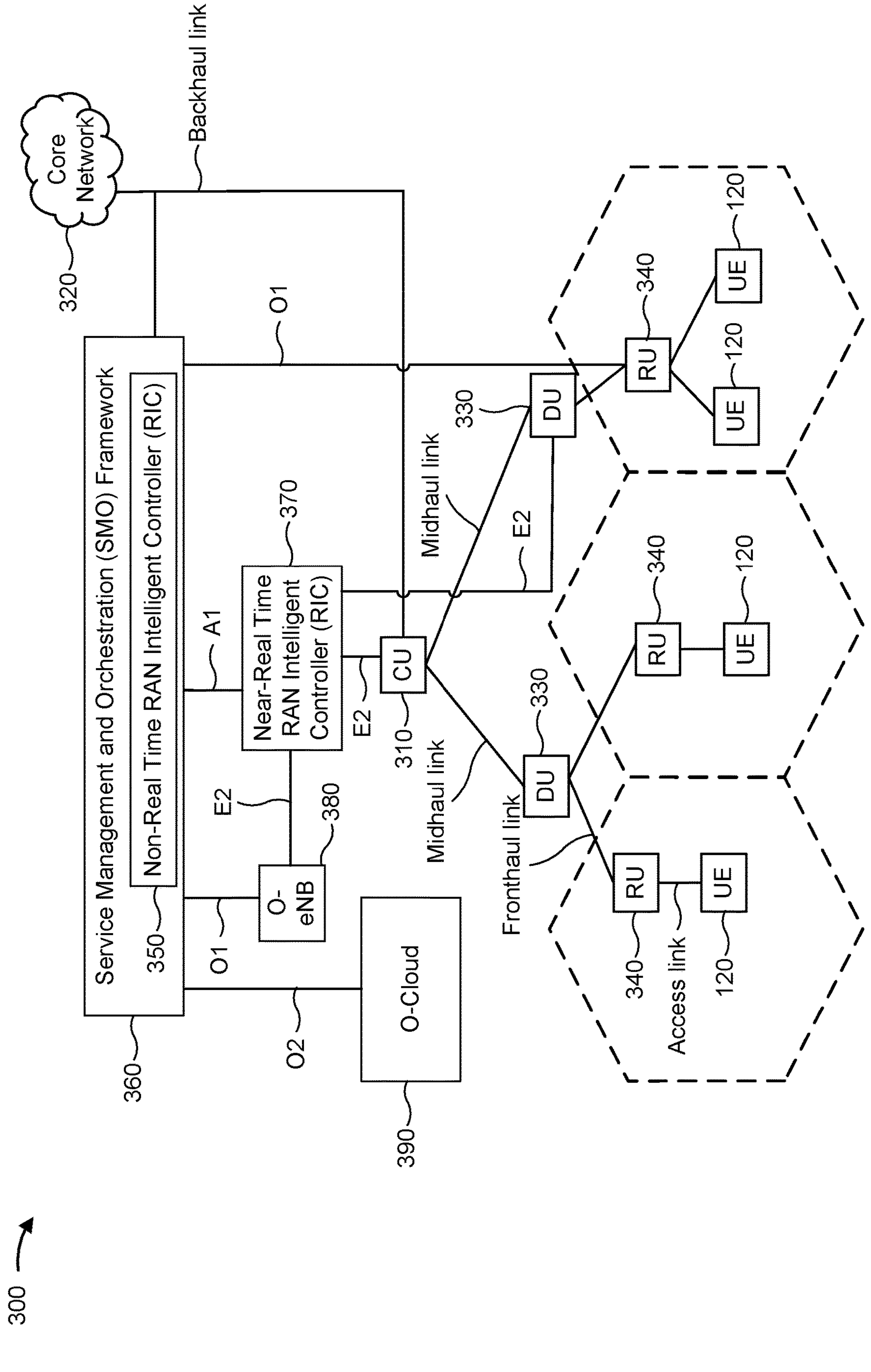
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with attention-only channel coding, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 800 of FIG. 8, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 800 of FIG. 8 or other processes as described herein. In some examples, executing instructions May include running the instructions, converting the instructions, compiling the instructions, and/or interpreting the instructions, among other examples.

In some aspects, a wireless communication device, such as UE 120, network node 110, or wireless communication device includes means for obtaining a message vector; means for generating a set of message sub-vectors using the message vector; means for generating a set of message embedding vectors corresponding to the set of message sub-vectors; means for generating, using a set of self-attention layers of an artificial neural network, a set of codeword embedding vectors corresponding to the set of message embedding vectors; means for generating, using the set of codeword embedding vectors, a set of codeword sub-vectors, wherein the set of codeword sub-vectors is permutation equivariant relative to the set of message sub-vectors; means for combining the set of codeword sub-vectors to generate a codeword vector; and/or means for transmitting a communication carrying the codeword vector. In some aspects, the means for the wireless communication device to perform operations described herein may include, for example, one or more of communication manager 140, transmit processor 214, TX MIMO processor 216, modem 232, antenna 234, MIMO detector 236, receive processor 238, controller/processor 240, memory 242, or scheduler 246. In some aspects, the means for the wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 4:
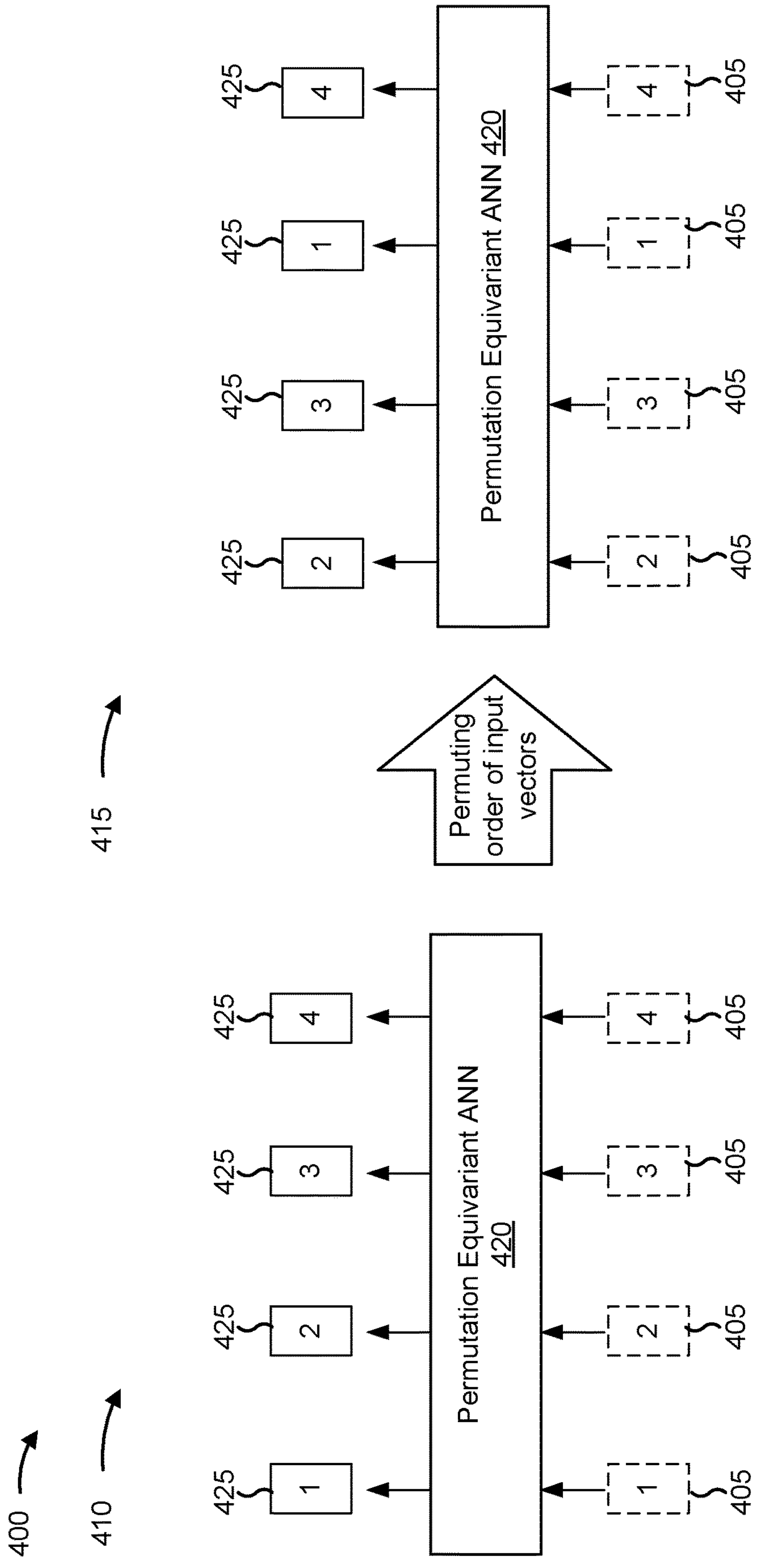
FIG. 4 is a diagram illustrating an example of permutation equivariance in accordance with the present disclosure.

FIG. 4 is a diagram illustrating an example 400 of permutation equivariance in accordance with the present disclosure. Permutation equivariance is a property used in aspects described herein to provide structure in a codebook generated by an ANN.

In example 400, a set of inputs 405 are shown with dashed outlines and numbered 1, 2, 3, and 4. The set of inputs 405 may include, for example, vectors, sub-vectors, values, patches, or tokens. A first permutation of the set of inputs 405 is shown by reference number 410 and a second permutation of the set of inputs 405 is shown by reference number 415. As shown, the set of inputs 405 is input to an ANN 420 (which may include or be an example of, for example, ANN 535, described below). The ANN 420 outputs a set of outputs 425. As shown, the set of outputs 425 has a same permutation as the set of inputs 405 for the first permutation shown by reference number 410. Furthermore, the set of outputs 425 has a same permutation as the set of inputs 405 for the second permutation shown by reference number 415. Thus, the set of outputs 425 are said to be permutation-equivariant with regard to the set of inputs 405.

Permutation equivariance is a property in which an input of the ANN 420 (such as the set of inputs 405), and an output of the ANN 420 (such as the set of outputs 425), behave in the same way under permutation operation on the set of inputs. Permutation equivariance can be contrasted against permutation invariance, which is a property in which an output of the ANN 420 is invariant when the input is permuted. A set of neural network operations denoted by $f_\theta$ is permutation-equivariant if, for any permutation matrix Π, the following condition is satisfied:

$$\Pi f_\theta(M)=f_\theta(\Pi M)$$

where M represents a matrix of input vectors. On the other hand, $f_\theta$ is permutation invariant if, for any Π, $f_\theta(\Pi M)=f_\theta(M)$. Thus, the set of outputs 425 (such as a set of codeword sub-vectors, described below) is permutation-equivariant relative to the set of inputs 405 (such as a set of message sub-vectors, described below) for all permutations of the set of inputs 405. For example, permutation equivariance may mean that for any order of the set of inputs 405, the same order is observed in the set of outputs 425.

A benefit of the permutation equivariance is that a structure of the output of the channel coding corresponds to a structure of an input of the channel coding. This is beneficial for decoding of the channel code.

Figure 5:
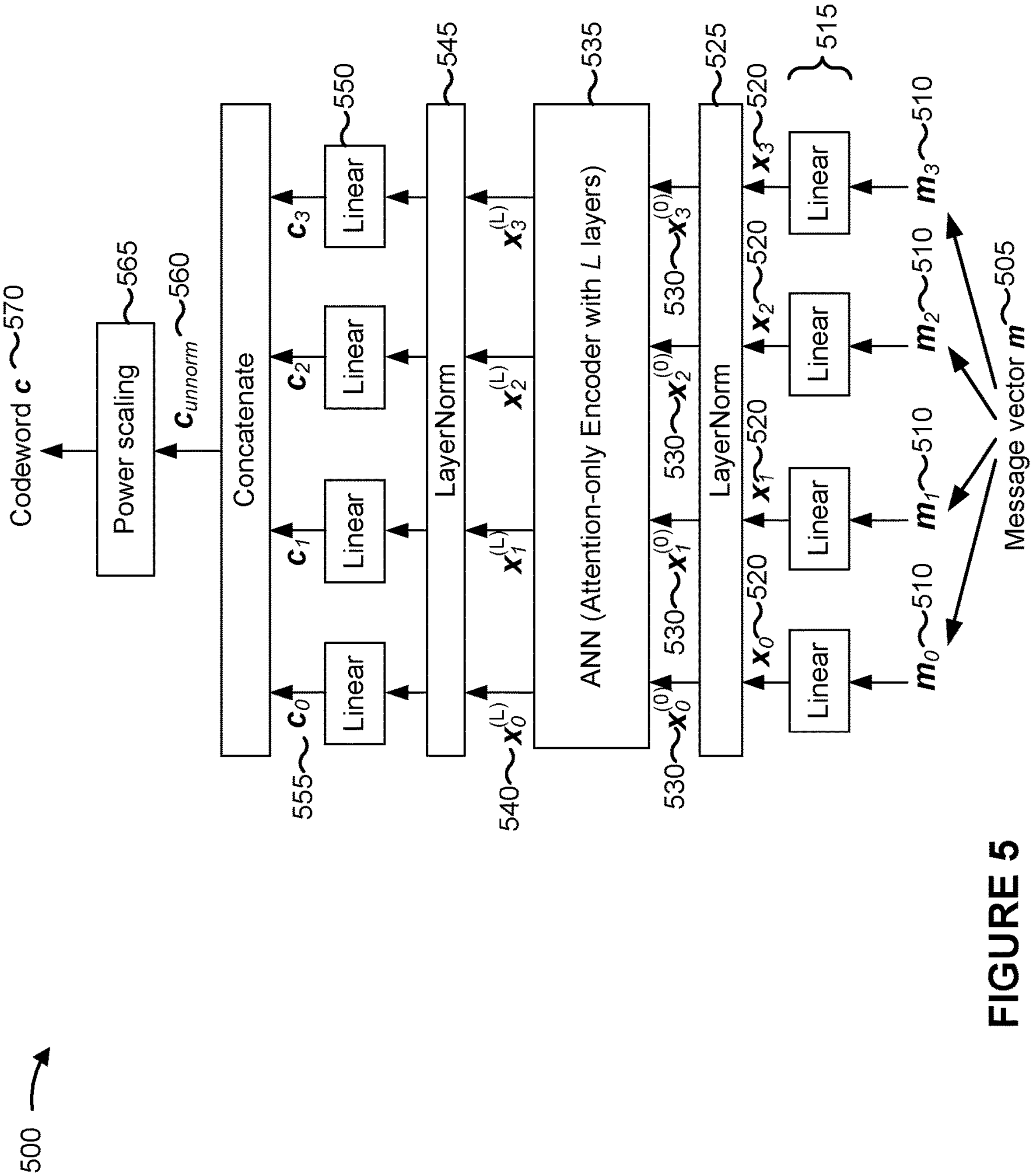
FIG. 5 is a diagram illustrating an example of channel coding using an artificial intelligence or machine learning model in accordance with the present disclosure.

FIG. 5 is a diagram illustrating an example 500 of channel coding using an AI/ML model in accordance with the present disclosure. In some aspects, the operations of example 500 may be performed by a device, such as a wireless communication device (which may include a UE 120, a network node 110, a CU 310, a DU 330, an RU 340, or a wireless communication device 1002), or a model server.

As shown, the device may obtain a message vector 505, denoted m. In some aspects, the message vector 505 *m* may include a number of k elements $m_0 \ldots m_{k-1}$. Note that references to sub-vectors of the message vector 505 *m* are denoted by bold and italics ($\boldsymbol{m}_n$) with a subscript denoting the sub-vector index, whereas references to elements of the message vector 505 *m* are denoted by italics without bold and with a subscript denoting the message element index ($m_i$). Similar notation is used throughout this description.

In some aspects, the device may generate the message vector 505 *m* using a 1×k bit vector b that includes k elements. For example, the bit vector b may include k binary values ($b \in \{0, 1\}^k$). In some aspects, the device may generate the message vector by converting bit values of the bit vector b into modified values of the message vector using a mapping $m_i=(-1)^{b_i}$, where $b_i$ is the i-th element of b, and $m_i$ is the i-th element of m. Thus, $m \in \{-1, 1\}^k$. This may be considered modifying values of the message vector. Generating the message vector 505 in this fashion may improve performance of the ANN relative to inputting the bit vector (or bit values) directly into the ANN.

As shown, the device may generate a set of message sub-vectors 510, denoted $\{\boldsymbol{m}_i\}$, using the message vector 505 *m*. For example, the device may split the message vector 505 into a set of non-overlapping message sub-vectors 510, which may be referred to as patching. Each message sub-vector 510 may be referred to as a token. For a 1×k message vector including k=11 elements, the message vector 505 may be split into 4 message sub-vectors 510: $m=[\boldsymbol{m}_0, \boldsymbol{m}_1, \boldsymbol{m}_2, \boldsymbol{m}_3]$, where $\boldsymbol{m}_0=[m_0, m_1, m_2]$, $\boldsymbol{m}_1=[m_3, m_4, m_5]$, $\boldsymbol{m}_2=$ $[m_6, m_7, m_8]$, and $m_3=[m_9, m_{10}, 1]$. In this example, $m_3$ includes a padding value of 1. In some aspects, the padding value may be a possible value of $m_i$, such as 1 or −1. In some aspects, the device may insert the padding value into the bit vector b (before converting the bit vector b into the message vector 505), in which case the padding value may be a possible value of $b_i$, such as 0 or 1. For example, the device may insert the padding value into a message sub-vector or the bit vector b, selected according to a table or a configuration parameter. The message vector m can be reshaped to a message matrix M by arranging the set of message sub-vectors as the rows of the message matrix, i.e. $M=[m_0; m_1; m_2; m_3]$, which is a convenient form for the processing by ANNs.

As shown, the device may generate, using a common input linear layer 515, a set of message embedding vectors 520, denoted X. For example, X may be defined as $$MW^{(0)}_{3\times d} + 1_{4\times 1}b^{(0)}_{1\times d} = [x_0; x_1; x_2; x_3], \text{ where } W^{(0)}_{3\times d}$$

denotes the weights of the common input linear layer 515, and $$b^{(0)}_{1\times d}$$

denotes the biases of the common input linear layer. The set of message embedding vectors 520 (denoted $\{x_i\}$) may correspond to the set of message sub-vectors 510. For example, the set of message embedding vectors 520 may be permutation-equivariant with regard to the set of message sub-vectors 510. This may be because, as shown, the common input linear layer 515 is implemented with a same mathematical operation for each message sub-vector 510 input to the common input linear layer 515, such as using a same mathematical operation in terms of the values of weights and biases applied for processing of each message sub-vector 510. Thus, the common input linear layer 515 may provide permutation equivariance between the set of message sub-vectors 510 and the set of message embedding vectors 520. As shown, in some aspects, the device may perform a normalization operation 525, such as a layer normalization operation or a batch normalization operation, on the set of message embedding vectors 520 to generate a set of normalized message embedding vectors 530, denoted $$x_i^{(0)},$$

where $$X^{(0)} = LayerNorm(X) = [x_0^{(0)}; x_1^{(0)}; x_2^{(0)}; x_3^{(0)}].$$

In some other aspects, example 500 may omit the normalization operation 525.

Notably, positional embedding is not applied to the message embedding vectors 520. Since the positional embedding is not applied to the message embedding vectors 520, the output of an ANN 535 satisfies the permutation equivariance property. For example, suppose that the message vector 505 is given by $m=[m_0, m_1, m_2, m_3]$, which is split into 4 message sub-vectors 510. Corresponding to the sequence of message sub-vectors $[m_0, m_1, m_2, m_3]$, the sequence of codeword embedding vectors 540 is given by $$[x_0^{(L)}, x_1^{(L)}, x_2^{(L)}, x_3^{(L)}].$$

Now, if the message vector (composed of message sub-vectors) were permuted to $[m_3, m_2, m_0, m_1]$, the corresponding codeword embedding vectors 540 would be permuted in the same way to $$[x_3^{(L)}, x_2^{(L)}, x_0^{(L)}, x_1^{(L)}].$$

This permutation equivariance simplifies implementation of decoding of the codeword generated using the corresponding codeword embedding vectors 540, and specification of the codebook.

As shown in FIG. 5, the device may generate, using an ANN 535, a set of codeword embedding vectors 540, denoted by $$\{x_i^{(L)}\}.$$

In FIG. 5, $$X^{(L)} = [x_0^{(L)}; x_1^{(L)}; x_2^{(L)}; x_3^{(L)}].$$

The set of codeword embedding vectors 540 may correspond to the set of message embedding vectors 520 (or the set of normalized message embedding vectors 530). For example, the set of codeword embedding vectors 540 may be permutation-equivariant with regard to the set of message embedding vectors 520 and/or the set of normalized message embedding vectors 530. L may denote a number of layers of the ANN 535. ANN 535 may include or be an example of ANN 420.

The ANN 535 may include a permutation-equivariant ANN. A permutation-equivariant ANN is an ANN of which an output of the ANN 535 is permutation-equivariant with an input of the ANN. As described herein, the ANN 535 may include one or more self-attention layers which may include one or more layer normalization layers. For example, the ANN 535 may consist of only the one or more self-attention layers (which may include the one or more layer normalization layers). An example architecture for the ANN 535 is provided in connection with FIG. 7. The ANN 535 may be configured, using one or more of the above layers or networks, to provide permutation equivariance between the set of codeword embedding vectors 540 and the set of message embedding vectors 520 or normalized message embedding vectors 530. For example, the ANN 535 may be constructed using layers that satisfy the permutation equivariance property, meaning that the ANN 535 satisfies the permutation equivariance property. As one example, the ANN 535 may include L self-attention layers. In some aspects, the device may perform a normalization operation 545, such as a layer normalization operation or a batch normalization operation, on the set of codeword embedding vectors 540 to generate a set of normalized codeword embedding vectors, denoted as $$X_{norm}^{(L)} = LayerNorm\left(X^{(L)}\right)$$

(not shown in FIG. 5).

ANN 535 may include at least one first layer of artificial neurons to process input data and provide resulting first layer data via connections or "edges" to at least a portion of at least one second layer. The at least one second layer may process data received via edges and may provide second layer output data via edges to at least a portion of at least one third layer. The at least one third layer may process data received via edges and provides third layer output data via edges (and so on) until a final layer is reached, where the final layer includes one or more neurons to provide output data.

As shown, the device may generate, using a common output linear layer 550, a set of codeword sub-vectors 555, denoted $\{c_i\}$ or collectively C. The device may generate the set of codeword sub-vectors 555 using the set of codeword embedding vectors 540 (or the set of normalized codeword embedding vectors) by inputting the set of codeword embedding vectors 540 or the set of normalized codeword embedding vectors to the common output linear layer 550. For example, C may be generated as $$X_{norm}^{(L)} W_{out} + b_{out} = [c_0; c_1; c_2; c_3],$$

where $W_{out}$ denotes the weights of the common output linear layer 550, and $b_{out}$ denotes the biases of the common output linear layer 550 The set of codeword sub-vectors 555 may correspond to the set of message sub-vectors 510. For example, the set of codeword sub-vectors 555 may be permutation-equivariant with regard to the set of message sub-vectors 510 (and with regard to the set of codeword embedding vectors 540). This may be because, as shown, the common output linear layer 550 uses a same mathematical operation for each codeword embedding vector 540 input to the common output linear layer 550, such as using a same mathematical operation in terms of the values of weights and biases applied for processing of each codeword embedding vector 540. Thus, the common output linear layer 550 may provide permutation equivariance between the set of codeword embedding vectors 540 and the set of codeword sub-vectors 555, thereby preserving the permutation equivariance of the message sub-vectors 510 and the codeword sub-vectors 555.

As shown, in some aspects, the device may combine the set of codeword sub-vectors 555 to generate a codeword vector 560, denoted $c_{unnorm}$. For example, the device may concatenate the set of codeword sub-vectors 555 to form the codeword vector 560. The codeword vector 560 may be referred to as an unnormalized codeword vector 560.

As shown, in some aspects, the device may perform a power scaling operation 565. In some aspects, the power scaling operation 565 may include normalizing the unnormalized codeword vector 560 in accordance with a target transmit power parameter, such that a codeword vector 570 conforms to the target transmit power parameter (which may be beneficial to improve consistency of transmit power across codewords). For example, the power scaling operation 565 may scale each codeword vector $c_{unnorm}$ in such a way that the average codeword power after power scaling meets the target transmit power parameter, for example, $E[\|c\|^2]=1$, where $E[\cdot]$ represents an expectation operator. In that case, each codeword may be allowed to have a different power. Alternatively, the power scaling operation 565 may scale each codeword vector $c_{unnorm}$ in such a way that each codeword has the same power, such as $\|c\|^2=1$ for all c. In some aspects, the power scaling operation 565 may include scaling a transmit power of the unnormalized codeword vector 560 in accordance with a scaling factor to generate the codeword vector 570, which may permit different codewords to have different transmit powers.

In some aspects, the device may generate a table, such as a lookup table, such as by generating a plurality of codeword vectors to populate the table. In this case, the device may generate the table prior to transmitting a codeword. For example, the table may represent a codebook for a channel code of example 500. The table may indicate combinations of message sub-vectors and a corresponding combination of codeword sub-vectors. The permutation-equivariant property of the message sub-vectors and the codeword sub-vectors may simplify implementation of the table for the specification of the codebook, and a decoder based on the table. For example, the permutation-equivariant property of the message sub-vectors may enable the codebook to be defined by specification of codeword sub-vectors (for example, instead of specifying entire codeword vectors corresponding to entire message vectors). For example, the permutation-equivariant property may enable identification of a codeword sub-vector $c_i$ corresponding to a particular message sub-vector $m_i$ of a message vector m by reference to (1) the particular message sub-vector $m_i$, and (2) the set of remaining message sub-vectors $\{m_j\}_j \backslash m_i$ of the message vector m. The backslash symbol denotes the set difference operation. Notably, the codeword sub-vector $c_i$ does not depend on the order of message sub-vectors in the set $\{m_j\}_j \backslash m_i$, which reduces a size of the table to be specified, and the amount of computation needed for the decoding. For example, a size of the table may be represented by a first dimension and a second dimension, wherein the first dimension is given by $$2^{number\ of\ bits\ in\ m_i} \times \binom{2^{number\ of\ bits\ in\ m_i} + \text{number of tokens} - 2}{2^{number\ of\ bits\ in\ m_i} - 1}$$

and the second dimension is given by (codeword length/number of tokens). Thus, the table is smaller than a table that explicitly defines mappings of all message vectors and codeword vectors by a factor of:

$$2^{k-number\ of\ bits\ in\ m_i} \times \text{number of tokens} \Big/ \binom{2^{number\ of\ bits\ in\ m_i} + \text{number of tokens} - 2}{2^{number\ of\ bits\ in\ m_i} - 1}.$$

As a particular example, consider a codebook constructed with four codeword sub-vectors, for k=11 (11 bits per message vector) and n=32 (32 bits per code block), and consider a neural network $f_\theta$ that computes the codeword given by $c=[c_0, c_1, c_2, c_3]$, where $c_i$ is the codeword sub-vector corresponding to the message sub-vector $m_i$. Due to the permutation equivariance property of the proposed non-linear code construction, codeword sub-vector $c_i$ can be identified by $c_i=f_\theta(m_i; \{m_0, m_1, m_2, m_3\}\backslash m_i)$, where $\{m_0,$ $m_1$, $m_2$, $m_3$} denotes the set of message sub-vectors $m_0$, $m_1$, $m_2$ and $m_3$, where the order of the message sub-vectors does not matter. Thus, the table does not need to have size $2^{11}\times32$. For example, the table may define codeword sub-vectors for all combinations of $m_0$ and the set $\{m_1, m_2, m_3\}$, where $m_i \in \{-1, 1\}^3$. The number of such combinations is smaller than $2^k$. For example, assuming that there was no zero-padding, the number of such combinations is provided by the combination operation $$8 * \binom{8+3-1}{8-1} = 960,$$

where "*" represents multiplication. Hence, the size of the table is 960×8, which is smaller than $2^{11}\times32$ by a factor of approximately 8.5.

An example of identifying a codeword vector using the table and a set of message sub-vectors is provided below. Each message sub-vector $m_i$ of a message vector m that includes 3 message sub-vectors includes two bits. Each codeword sub-vector may include 8 real-valued symbols (not illustrated here). As shown, a row of the table indicates (1) a given message sub-vector (denoted ma to avoid confusion with indexes of message sub-vectors); (2) a set of remaining message sub-vectors of the message vector (denoted $m_b$ and $m_c$ to avoid confusion with indexes of message sub-vectors); and (3) a corresponding codeword sub-vector $c_a$. Table 1 is an example of some rows of a table representing a codebook:

TABLE 1

| $m_a$ | $\{m_b, m_c\}$ | $c_a$ |
|---|---|---|
| [+1, +1] | {[+1, −1], [−1, +1]} | α |
| [+1, −1] | {[+1, +1], [−1, +1]} | β |
| [−1, +1] | {[+1, +1], [+1, −1]} | γ |

If a transmitter is to transmit a bit vector [0, 0, 0, 1, 1, 0], the transmitter may first convert the bit vector to a message vector: [+1, +1, +1, −1, −1, +1]. The transmitter may then divide the message vector into three message sub-vectors: $m_0$=[+1, +1]; $m_1$=[+1, −1]; $m_2$=[−1, +1]. To compute the codeword sub-vector corresponding to $m_0$, the transmitter may refer to a row of the table that indicates (1) $m_0$ (in this case, [+1, +1]), and (2) remaining message sub-vectors of the message vector (in this case, {[+1, −1], [−1, +1]}). Thus, the transmitter may refer to the first row of the table. Notably, the order of $m_b$ and $m_c$ in the message vector is not a factor in identifying the codeword sub-vector. Thus, the transmitter may identify α as a codeword sub-vector corresponding to $m_0$. To compute the codeword sub-vector corresponding to $m_1$, the transmitter may refer to a row of the table that indicates (1) $m_1$ (in this case, [+1, −1]), and (2) remaining message sub-vectors of the message vector (in this case, {[+1, +1], [−1, +1]}). Thus, the transmitter may refer to the second row of the table and may identify β as a codeword sub-vector corresponding to $m_1$. To compute the codeword sub-vector corresponding to $m_2$, the transmitter may refer to a row of the table that indicates (1) $m_2$ (in this case, [−1, +1]), and (2) remaining message sub-vectors of the message vector (in this case, {[+1, +1], [+1, −1]}). Thus, the transmitter may refer to the third row of the table and may identify γ as a codeword sub-vector corresponding to $m_2$. In this way, the transmitter may identify the codeword vector as [α, β, γ].

The ANN 535 or the AI/ML model may be implemented in various types of processing circuits along with memory and applicable instructions therein. For example, general-purpose hardware circuits, such as one or more CPUs, one or more GPUs, or suitable combinations thereof, may be employed to implement a model. In some implementations, one or more tensor processing units (TPUs), neural processing units (NPUs), or other special-purpose processors, FPGAs, ASICs, or the like may also be employed. In some implementations, the ANN 535 or the AI/ML model may be implemented by an NPU or a TPU embedded in a system-on-chip (SoC) along with other components, such as one or more CPUs, GPUs, or the like. An SoC includes several components manufactured on a shared semiconductor substrate. The NPU or TPU may be controlled by the one or more CPUs by configuring the AI/ML model implemented by the NPU or TPU with weights and biases, providing certain training data to the AI/ML model to configure the AI/ML model, or providing input data to the AI/ML model to obtain related inferences. The one or more CPUs may also receive the inferences and be configured to perform certain actions based on the inferences produced by the AI/ML model. The actions performed by the one or more CPUs may include sending commands to other components of the SoC or components external to the SoC to perform certain actions. For example, the CPU may send commands to an RF transceiver based on the outputs or inferences obtained from an AI/ML model to cause the RF transceiver to operate on a wireless network in accordance with the AI/ML model.

Figure 6:
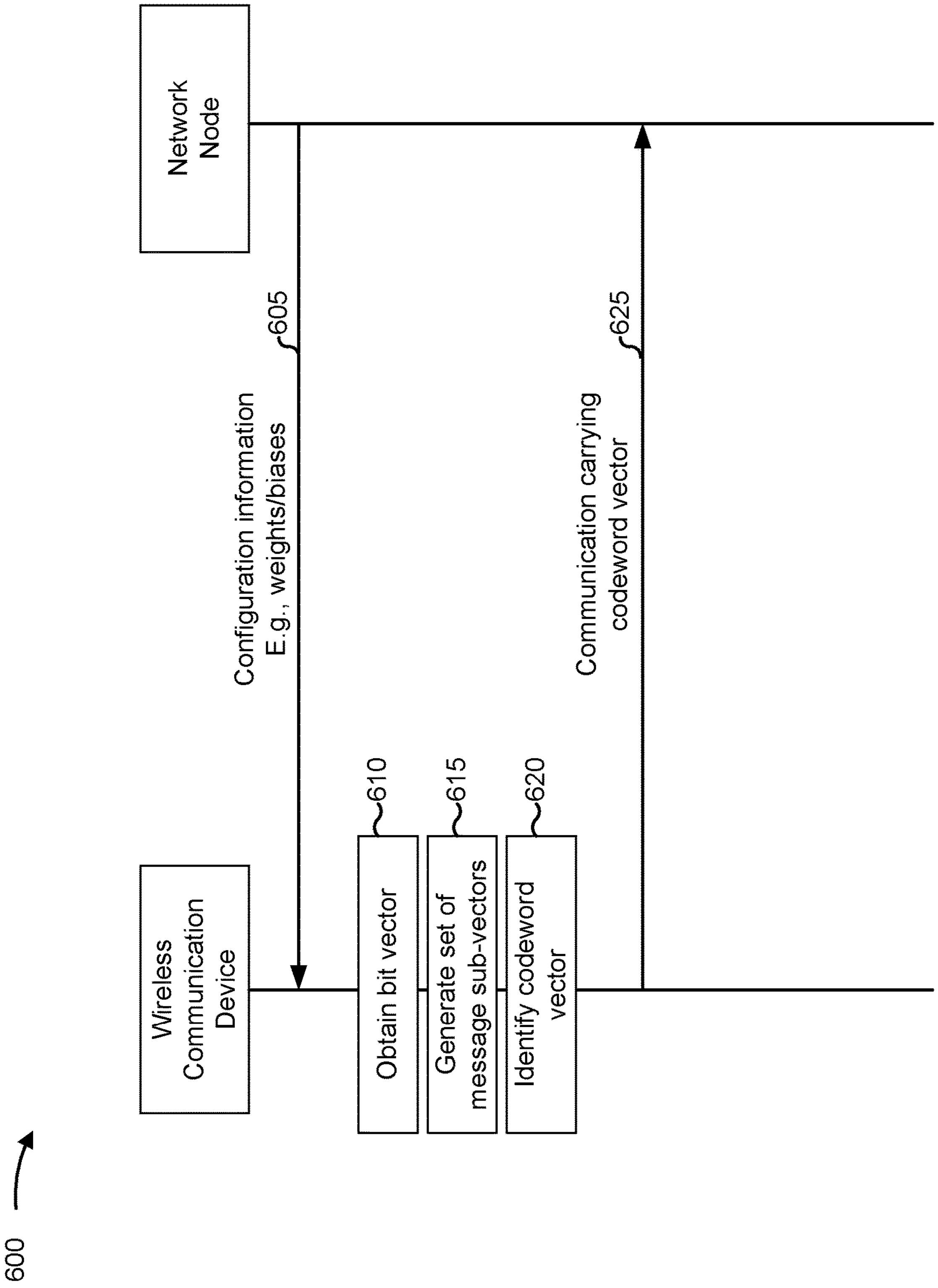
FIG. 6 is a diagram illustrating an example of signaling associated with permutation-equivariant neural network channel coding in accordance with the present disclosure.

FIG. 6 is a diagram illustrating an example 600 of signaling associated with permutation-equivariant neural network channel coding in accordance with the present disclosure. Example 600 includes a wireless communication device (for example, UE 120 or network node 110) and a network node (for example, network node 110). In example 600, the wireless communication device transmits an encoded communication to the network node. In some other examples, the wireless communication device may transmit the encoded communication to an entity other than the network node, such as another wireless communication device or another network node.

As shown, in some aspects, the network node may transmit, and the wireless communication device may receive, configuration information 605. The configuration information 605 may be communicated via, for example, RRC signaling, medium access control signaling, downlink control information, or system information. In some aspects, at least part of the configuration information 605 may be pre-configured for the wireless communication device (such as in accordance with a wireless communication specification or by a vendor or operator associated with the wireless communication device).

In some aspects, the configuration information may indicate a set of model parameters for an AI/ML model, such as the AI/ML model described with regard to FIG. 5. For example, the set of model parameters may include a set of parameters for a common input linear layer 515, the ANN 535 (such as one or more self-attention layers of the ANN 535), a common output linear layer 550, or another element of the AI/ML model. In some aspects, the set of model parameters may include, for example, a set of weights, a set of biases, and/or a number of layers. As further examples, the set of model parameters may include one or more projection matrices associated with projecting queries, keys and/or values, one or more projection matrices to combine the results from the heads of a self-attention layer, a layer normalization parameter, or a combination thereof. In this example, the wireless communication device may perform the operations of example 500 or example 600 using the set of model parameters. In some aspects, the set of model parameters may be associated with a number of bits of a message payload of a message vector. For example, one set of model parameters may be configured for a message payload of 11 bits, and another set of model parameters may be configured for a message payload of 13 bits. In some aspects, the set of model parameters may be associated with one or more message parameters, such as a number of message sub-vectors, a number of bits to pad, which message sub-vector contains the bits to pad, or a combination thereof. For example, one set of model parameters may be configured for a first number of message sub-vectors, and another set of model parameters may be configured for a second number of message sub-vectors.

Notably, signaling the set of model parameters for the AI/ML model and generating codewords at the wireless communication device may reduce overhead or complexity relative to other approaches for defining the channel code, such as a table. For example, the ANN that includes only self-attention layers (and in some aspects corresponding layer normalization layers) may provide similar performance (in terms of bit error rate) as an ANN that includes, for example, a set of transformer layers. For example, the ANN including only 6 self-attention layers may provide approximately equivalent performance with an embedding dimension of 16 or 12 and 2 heads, as a transformer-based ANN with 6 transformer layers, an embedding dimension of 64, and 8 heads.

As an example, assume 12 information bits in a message vector, a number of tokens of 4 (indicating 4 message sub-vectors per message vector), 3 bits per message sub-vector (or token), and 32 code symbols (that is, codeword length=32). A lookup table for this code may have a first dimension defined as $$2^{number\ of\ bits\ in\ m_i} * \binom{2^{number\ of\ bits\ in\ m_i} + \text{number of tokens} - 2}{2^{number\ of\ bits\ in\ m_i} - 1}$$

and a second dimension defined as "codeword length/number of tokens". In this example, the first dimension may be equal to 960 and the second dimension may be equal to 8, leading to a total number of table parameters of 7680.

An AI/ML model that incorporates an ANN including only self-attention layers (referred to now as an attention-only encoder) may be associated with a set of model parameters. For example, the model parameters may include parameters for each self-attention layer (such as one or more projection matrices and/or a layer normalization parameter), parameters for an input layer (such as a common input linear layer), parameters for an output layer (such as a common output linear layer), parameters for layer normalization at an input of the AI/ML model, and/or parameters for layer normalization at an output of the AI/ML model. Depending on the number of self-attention layers and an embedding dimension of the ANN, the AI/ML model may be defined by approximately 3800 to 6600 model parameters. Therefore, explicitly signaling the model parameters of the AI/ML model to a wireless communication device may involve lower overhead or storage space utilization than signaling the table parameters to the wireless communication device. Furthermore, the attention-only encoder may provide comparable (such as equivalent) performance to an encoder incorporating one or more transformer layers.

In some aspects, the configuration information may indicate a set of message parameters. A message parameter may indicate, for example, a number of padding values (such as how many bits should be appended to a message payload), a message sub-vector that is to contain the number of padding values, or a number of message sub-vectors to be generated from (such as by splitting) a message vector. In some aspects, the set of message parameters may correspond to a size of a message payload.

In an operation 610, the wireless communication device may obtain a bit vector, such as the bit vector b described with regard to FIG. 5. In an operation 615, the wireless communication device may generate a set of message sub-vectors, as described with regard to message sub-vectors 510.

In an operation 620, the wireless communication device may identify a codeword vector. In some aspects, the wireless communication device may identify the codeword vector using an AI/ML model, such as the AI/ML model described with regard to FIG. 5. In some other aspects, the wireless communication device may identify the codeword vector using a table, such as the table described with regard to FIG. 5.

In some aspects, the wireless communication device may identify a table for identifying the codeword vector. For example, multiple tables may be defined (such as by configuration or a wireless communication specification). An example of a table, of the multiple tables, is provided in connection with FIG. 5. A table, of the multiple tables, may correspond to a number of message sub-vectors into which a message vector is divided. Additionally, or alternatively, a table may correspond to a number of bits to pad and/or which message sub-vector contains the padding bits. For example, the wireless communication device may identify a table that corresponds to a number of message sub-vectors into which a message vector is divided, a number of bits to pad, and a message sub-vector to contain the padding bits, and may identify the codeword vector according to the table. In some aspects, the wireless communication device may be configured with information indicating the number of message sub-vectors, the number of bits to pad, and/or which message sub-vector to pad, such as in the configuration information 605.

In an operation 625, the wireless communication device may transmit a communication carrying the codeword vector c. For example, channel codes generated by AI/ML may take values from the set of real numbers (as opposed to binary values), meaning that a codeword (such as the codeword vector c) can be transmitted without being subject to modulation (such as quadrature amplitude modulation). Thus, the wireless communication device may perform joint coding and modulation.

Figure 7:
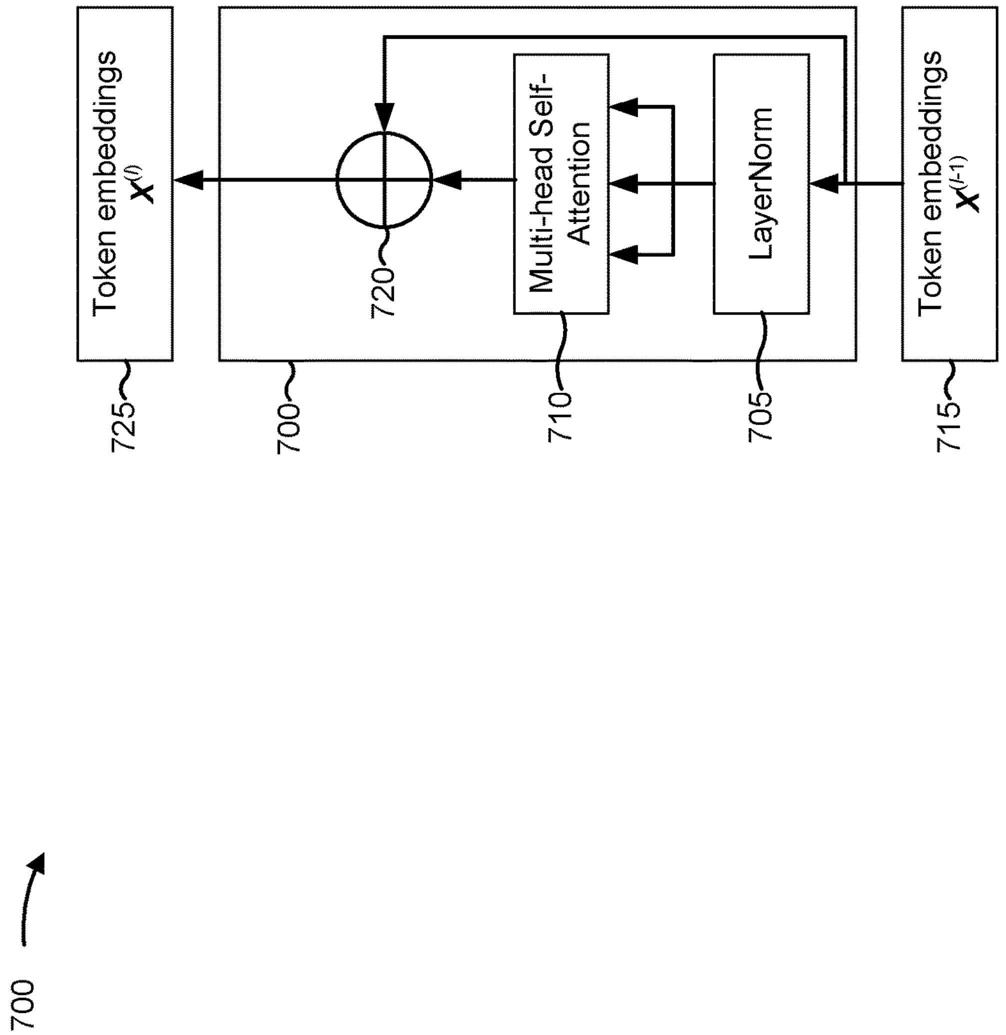
FIG. 7 is a diagram illustrating an example of a self-attention layer in accordance with the present disclosure.

FIG. 7 is a diagram illustrating an example of a self-attention layer 700 in accordance with the present disclosure. The self-attention layer 700 may be included in an ANN, such as ANN 535. For example, the ANN 535 may consist of one or more self-attention layers 700.

As shown, a self-attention layer 700 may include a layer normalization module 705 and a multi-head self-attention module 710. The self-attention layer 700 may be an l-th self-attention layer 700 of an ANN. The self-attention layer 700 may receive, as input, a set of token embeddings 715, denoted $X^{(l-1)}$, from a previous layer, which May be self-attention layer l−1. In some aspects, the set of token embeddings computed by the self attention layer l may include, for example, a set of embedding vectors $$\{x_n^{(l)};\, n = 0, 1, \ldots\}.$$

The layer normalization module 705 may perform a layer normalization operation on the set of token embeddings 715, which may be denoted $LN(X^{(l-1)})$. The multi-head self-attention module 710 may process the set of token embeddings 715, which may be denoted $MSA(LN(X^{(l-1)}))$ (where "MSA" is an abbreviation of "multi-head self-attention"). In a combination operation 720, the self-attention layer may combine an output of the multi-head self-attention module 710 (denoted $MSA(LN(X^{(l-1)})$) and the set of token embedding 715 to generate a matrix comprising an output set of token embeddings 725 (denoted $X^{(l)}$). The matrix $X^{(l)}$ (for l=1, 2, . . . , L) may contain a set of token embeddings. For example, the n-th row of the matrix $X^{(l)}$ may contain the d-dimensional embedding vector $$x_n^{(l)}$$

for the n-th token. Thus, $$X^{(l)} = [\ \ldots\ ; x_{n-1}^{(l)}; x_n^{(l)}; x_{n+1}^{(l)}; \ldots\ ],$$

where $$x_n^{(l)}$$

is a 1×d row vector.

The self-attention layer 700 may differ from a transformer layer in that a transformer layer may also include another layer normalization module after the operation 720 and a multi-layer perceptron module after the other layer normalization module. The attention-only encoder achieves good performance-complexity tradeoff by attaining the performance comparable to that of the transformer encoder, while reducing not only the number of model parameters to be specified in the specification, or to be signaled, but also the amount of computation for codeword generation, if on-line computation of the codewords is chosen for the modem implementation.

Figure 8:
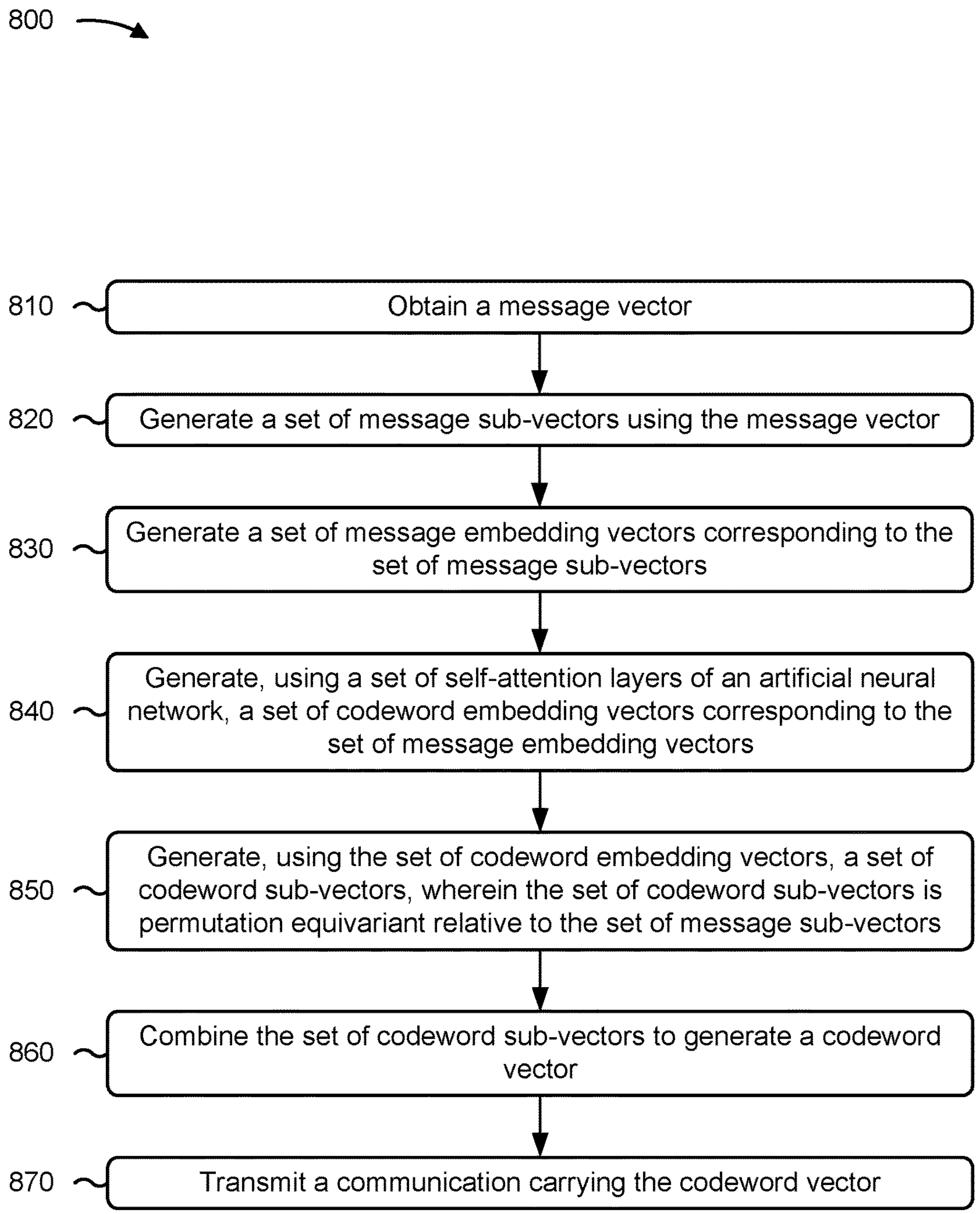
FIG. 8 is a diagram illustrating an example process performed, for example, at a wireless communication device, in accordance with the present disclosure.

FIG. 8 is a flowchart illustrating an example process 800, for example, at a wireless communication device such as a UE or a network node, or an apparatus of the wireless communication device, that supports attention-only channel coding in accordance with the present disclosure. Example process 800 is an example where the apparatus or the wireless communication device (for example, UE 120 or network node 110 or wireless communication device 1002) performs operations associated with permutation-equivariant neural channel coding construction.

As shown in FIG. 8, in some aspects, process 800 may include obtaining a message vector (block 810). For example, the wireless communication device (such as by using communication manager 140 or reception component 902, depicted in FIG. 9) may obtain a message vector (m), as described at 505.

As further shown in FIG. 8, in some aspects, process 800 may include generating a set of message sub-vectors using the message vector (block 820). For example, the UE (such as by using communication manager 140 or AI/ML model component 908, depicted in FIG. 9) may generate a set of message sub-vectors ($m_i$) using the message vector, as described at 510.

As further shown in FIG. 8, in some aspects, process 800 may include generating a set of message embedding vectors corresponding to the set of message sub-vectors (block 830). For example, the UE (such as by using communication manager 140 or AI/ML model component 908, depicted in FIG. 9) may generate a set of message embedding vectors ($x_i$) corresponding to the set of message sub-vectors, as described at 520.

As further shown in FIG. 8, in some aspects, process 800 may include generating, using a set of self-attention layers of an artificial neural network, a set of codeword embedding vectors corresponding to the set of message embedding vectors (block 840). For example, the UE (such as by using communication manager 140 or ANN component 910, depicted in FIG. 9) may generate, using a set of self-attention layers of an artificial neural network, a set of codeword embedding vectors $$(x_i^{(L)})$$

corresponding to the set of message embedding vectors, as described at 530 and 540 with regard to ANN 535.

As further shown in FIG. 8, in some aspects, process 800 may include generating, the set of codeword embedding vectors, a set of codeword sub-vectors, wherein the set of codeword sub-vectors is permutation equivariant relative to the set of message sub-vectors (block 850). For example, the UE (such as by using communication manager 140 or AI/ML model component 908, depicted in FIG. 9) may generate, using the set of codeword embedding vectors, a set of codeword sub-vectors ($c_i$), wherein the set of codeword sub-vectors is permutation equivariant relative to the set of message sub-vectors, as described above.

As further shown in FIG. 8, in some aspects, process 800 may include combining the set of codeword sub-vectors to generate a codeword vector (block 860). For example, the UE (such as by using communication manager 140 or AI/ML model component 908, depicted in FIG. 9) may combine the set of codeword sub-vectors to generate a codeword vector (c or $c_{unnorm}$), as described at 560.

As further shown in FIG. 8, in some aspects, process 800 may include transmitting a communication carrying the codeword vector (block 870). For example, the UE (such as by using communication manager 140 or transmission component 904, depicted in FIG. 9) may transmit a communication carrying the codeword vector, as described above.

Process 800 may include additional aspects, such as any single aspect or any combination of aspects described below or in connection with one or more other processes described elsewhere herein.

In a first additional aspect, generating the set of message embedding vectors further comprises generating the set of message embedding vectors using a common input linear layer.

In a second additional aspect, alone or in combination with the first aspect, generating the set of codeword sub-vectors further comprises generating the set of codeword sub-vectors using a common output linear layer.

In a third additional aspect, alone or in combination with one or more of the first and second aspects, the artificial neural network consists of the set of self-attention layers.

In a fourth additional aspect, alone or in combination with one or more of the first through third aspects, the artificial neural network is a permutation-equivariant artificial neural network.

In a fifth additional aspect, alone or in combination with one or more of the first through fourth aspects, process 800 includes normalizing the codeword vector in accordance with a target transmit power parameter.

In a sixth additional aspect, alone or in combination with one or more of the first through fifth aspects, process 800 includes scaling a transmit power parameter of the codeword vector.

In a seventh additional aspect, alone or in combination with one or more of the first through sixth aspects, process 800 includes receiving, prior to obtaining the message vector, information indicating a set of model parameters for the artificial neural network, wherein generating the set of codeword embedding vectors is in accordance with the information indicating the set of model parameters.

In an eighth additional aspect, alone or in combination with one or more of the first through seventh aspects, the set of model parameters indicates at least one of a set of weights or a set of biases.

In a ninth additional aspect, alone or in combination with one or more of the first through eighth aspects, the set of model parameters is associated with a number of bits of a message payload of the message vector.

In a tenth additional aspect, alone or in combination with one or more of the first through ninth aspects, process 800 includes receiving, prior to obtaining the message vector, a set of message parameters, wherein the set of message parameters indicates, for the message payload, at least one of a number of padding values, a message sub-vector, of the set of message sub-vectors, that is to contain the number of padding values, or a number of message sub-vectors in the set of message sub-vectors.

In an eleventh additional aspect, alone or in combination with one or more of the first through tenth aspects, the set of message parameters is associated with a number of bits of a message payload of the message vector.

In a twelfth additional aspect, alone or in combination with one or more of the first through eleventh aspects, generating the set of message sub-vectors further comprises adding a padding value to one or more message sub-vectors of the set of message sub-vectors.

In a thirteenth additional aspect, alone or in combination with one or more of the first through twelfth aspects, process 800 includes converting a bit value of the message vector to a modified value prior to generating the set of message embedding vectors.

In a fourteenth additional aspect, alone or in combination with one or more of the first through thirteenth aspects, the set of codeword sub-vectors is permutation equivariant relative to the set of message sub-vectors such that, for a given permutation of the set of message sub-vectors, the set of codeword sub-vectors is arranged in accordance with the given permutation.

In a fifteenth additional aspect, alone or in combination with one or more of the first through fourteenth aspects, the set of codeword sub-vectors is permutation equivariant relative to the set of message sub-vectors for all permutations of the set of message sub-vectors.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
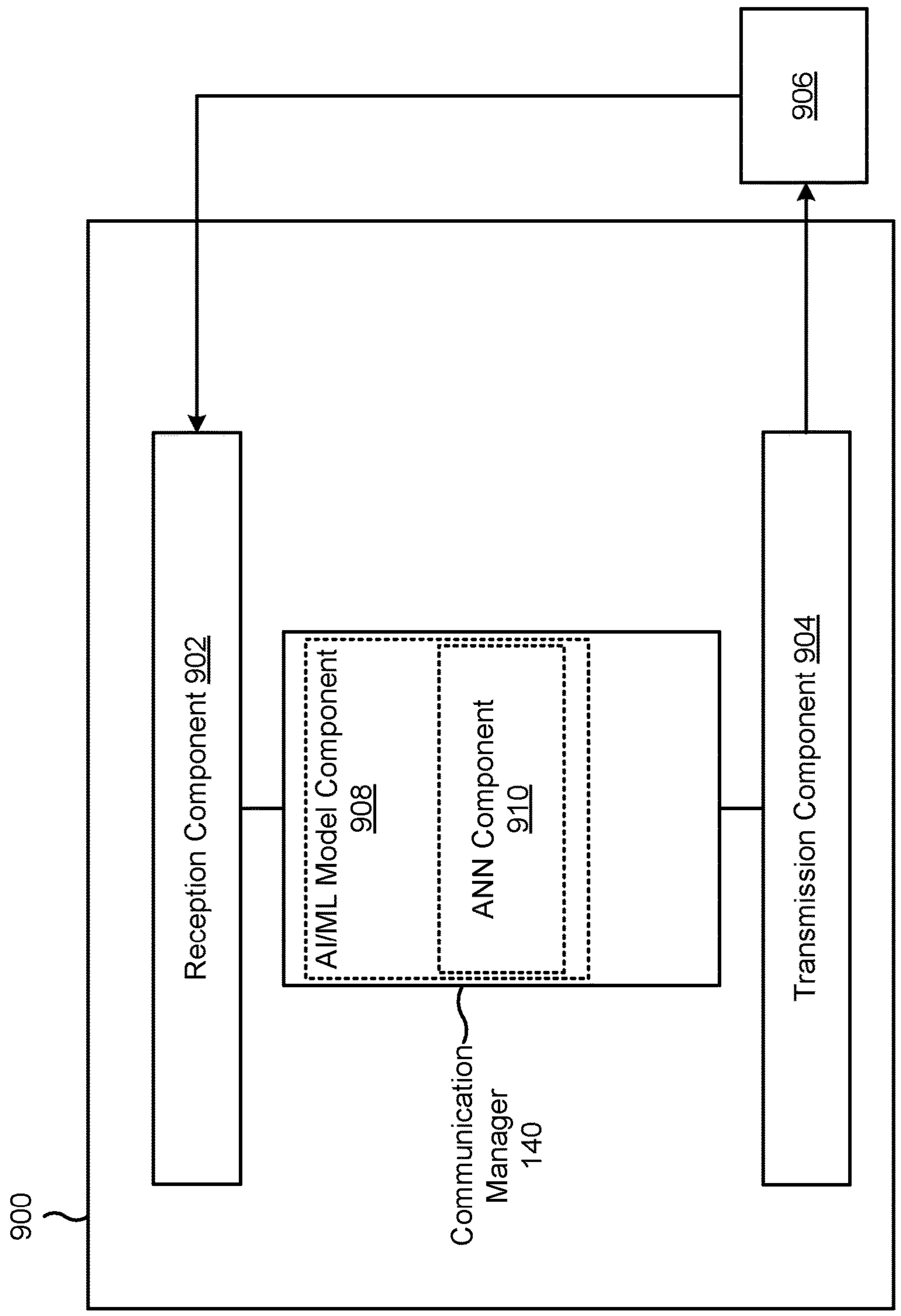
FIG. 9 is a diagram of an example apparatus for wireless communication, in accordance with the present disclosure.

FIG. 9 is a diagram of an example apparatus 900 for wireless communication that supports attention-only channel coding in accordance with the present disclosure. The apparatus 900 may be a wireless communication device, or a wireless communication device may include the apparatus 900. In some aspects, the apparatus 900 includes a reception component 902, a transmission component 904, and a communication manager 140, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to and/or operable to perform one or more operations described herein in connection with FIGS. 4-7. Additionally or alternatively, the apparatus 900 may be configured to and/or operable to perform one or more processes described herein, such as process 800 of FIG. 8. In some aspects, the apparatus 900 may include one or more components of the wireless communication device described above in connection with FIG. 2.

The reception component 902 may receive communications, such as reference signals, control information, and/or data communications, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, one or more modems, one or more demodulators, one or more MIMO detectors, one or more receive processors, one or more controllers/processors, and/or one or more memories of the wireless communication device described above in connection with FIG. 2.

The transmission component 904 may transmit communications, such as reference signals, control information, and/or data communications, to the apparatus 906. In some aspects, the communication manager 140 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, one or more modems, one or more modulators, one or more transmit MIMO processors, one or more transmit processors, one or more controllers/processors, and/or one or more memories of the wireless communication device described above in connection with FIG. 2. In some aspects, the transmission component 904 may be co-located with the reception component 902 in one or more transceivers.

The communication manager 140 may obtain a message vector. The communication manager 140 may generate a set of message sub-vectors using the message vector. The communication manager 140 may generate a set of message embedding vectors corresponding to the set of message sub-vectors. The communication manager 140 may generate, using a set of self-attention layers of an artificial neural network, a set of codeword embedding vectors corresponding to the set of message embedding vectors. The communication manager 140 may generate, using the set of codeword embedding vectors, a set of codeword sub-vectors, wherein the set of codeword sub-vectors is permutation equivariant relative to the set of message sub-vectors. The communication manager 140 may combine the set of codeword sub-vectors to generate a codeword vector. The communication manager 140 may transmit or may cause the transmission component 904 to transmit a communication carrying the codeword vector. In some aspects, the communication manager 140 may perform onc or more operations described elsewhere herein as being performed by one or more components of the communication manager 140.

The communication manager 140 may include one or more controllers/processors, one or more memories, one or more schedulers, and/or one or more communication units of the wireless communication device described above in connection with FIG. 2. In some aspects, the communication manager 140 includes a set of components, such as an AI/ML model component 908, which may include an ANN component 910. Alternatively, the set of components may be separate and distinct from the communication manager 140. In some aspects, one or more components of the set of components may include or may be implemented within one or more controllers/processors, one or more memories, one or more schedulers, and/or one or more communication units of the wireless communication device described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may obtain a message vector. The AI/ML model component 908 may generate a set of message sub-vectors using the message vector. The AI/ML model component 908 may generate a set of message embedding vectors corresponding to the set of message sub-vectors. The AI/ML model component 908 or the ANN component 910 may generate, using a set of self-attention layers of an artificial neural network, a set of codeword embedding vectors corresponding to the set of message embedding vectors. The AI/ML model component 908 may generate, using the set of codeword embedding vectors, a set of codeword sub-vectors, wherein the set of codeword sub-vectors is permutation equivariant relative to the set of message sub-vectors. The AI/ML model component 908 may combine the set of codeword sub-vectors to generate a codeword vector. The transmission component 904 may transmit a communication carrying the codeword vector.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
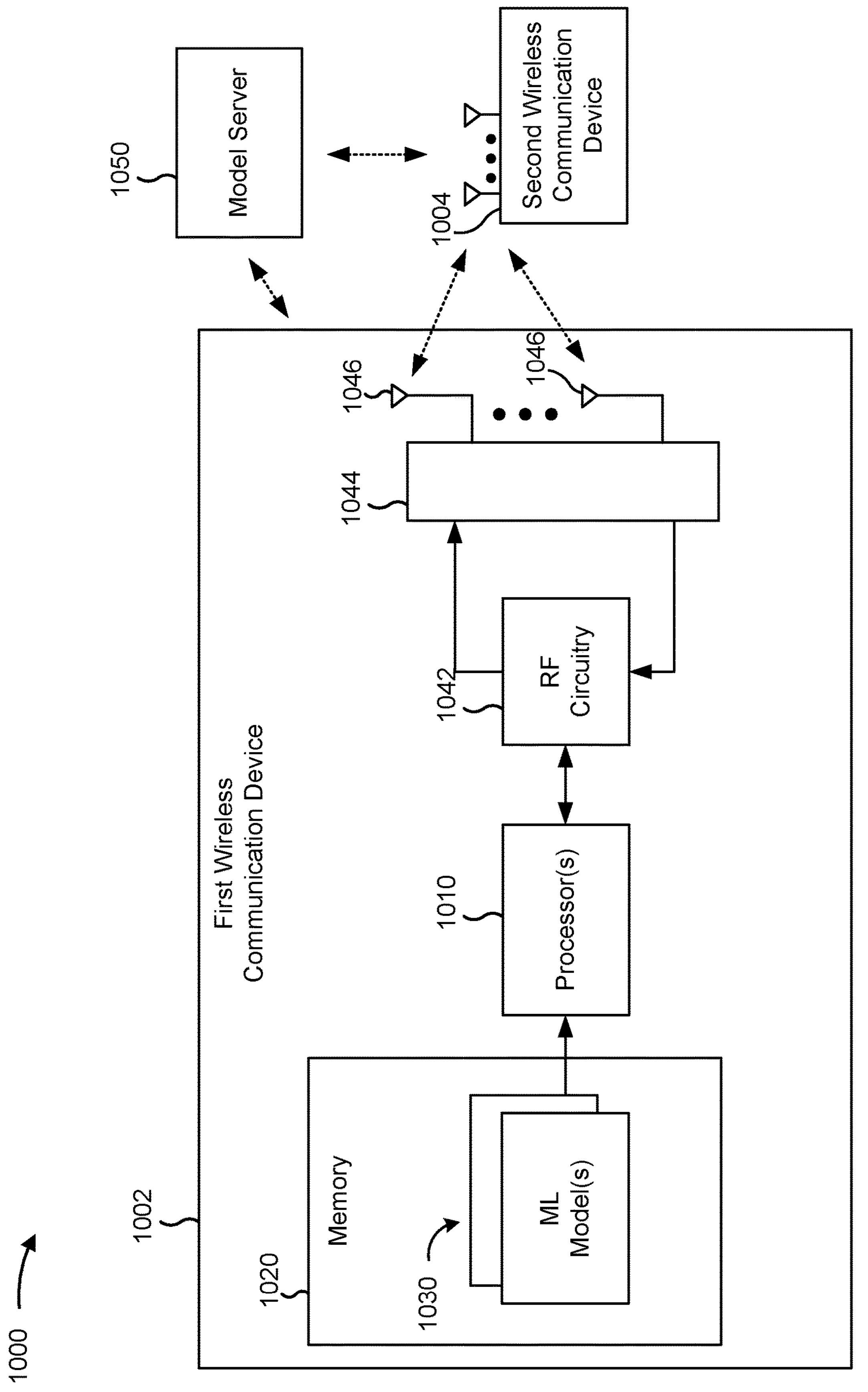
FIG. 10 is an illustrative block diagram of an example machine learning architecture of a first wireless communication device in communication with a second wireless communication device.

FIG. 10 is an illustrative block diagram of an example ML architecture 1000 of a first wireless communication device 1002 in communication with a second wireless communication device 1004. First wireless communication device 1002 may be configured for attention-only channel coding. Similarly, the second wireless communication device 1004 may be configured for attention-only channel coding. Note that the example ML architecture of the first wireless communication device 1002 may be applied to second wireless communication device 1004, and vice versa.

First wireless communication device 1002 may be, or may include, a chip, system on chip (SoC), chipset, package or device that includes one or more processors, processing blocks or processing elements (collectively "processor 1010") and one or more memory blocks or elements (collectively "memory 1020"). Processor 1010 may be coupled to transceiver C40, which includes radio frequency (RF) circuitry 1042 coupled to antennas 1046 via interface 1044, for transmitting or receiving signals.

One or more AI/ML models 1030 (collectively "AI/ML model 1030", and which may be the AI/ML model described with regard to FIG. 5) may be stored in memory 1020 and accessible to processor(s) 1010. Individual or groups of AI/ML models 1030 maybe associated with respective model identifiers. In some aspects, different AI/ML models 1030, which may optionally be associated with different model identifiers, may have different characteristics. One or more AI/ML models 1030 may be selected based on respective features, characteristics, or applications, as well as characteristics or conditions of first wireless communication device 1002 (such as a power state, a mobility state, a battery reserve, or a temperature). For example, AI/ML models 1030 may have different inference data and output pairings (such as different types of inference data producing different types of output), different levels of accuracies associated with the predictions, different latencies associated with producing the predictions, different AI/ML model sizes, different coefficients, different parameters, etc.

Processor 1010 may deploy AI/ML models 1030 to produce respective output data based on input data. The input data may include a message sub-vector or a group of message sub-vectors (or a vector derived from one of these sub-vectors, such as an embedding vector). The output data may include a codeword sub-vector, a codeword embedding vector, or a codeword vector.

In some aspects, model server 1050 may perform various ML management tasks for first wireless communication device 1002 and/or second wireless communication device 1004. For example, model server 1050 may host various types and/or versions of AI/ML models 1030 for first wireless communication device 1002 and/or second wireless communication device 1004 to download. Model server 1050 may provide model parameters for AI/ML models 1030. Model server 1050 may transmit signals or provide indications/instructions to activate or deactivate the use of a particular AI/ML model at first wireless communication device 1002 or second wireless communication device 1004. Model server 1050 may switch to a different AI/ML model being used at first wireless communication device 1002 or second wireless communication device 1004, and model server 1050 may provide such an instruction to the respective first wireless communication device 1002 or second wireless communication device 1004.

The following provides an overview of some Aspects of the present disclosure:

Aspect 1: A method of wireless communication performed by a wireless communication device, comprising: obtaining a message vector; generating a set of message sub-vectors using the message vector; generating a set of message embedding vectors corresponding to the set of message sub-vectors; generating, using a set of self-attention layers of an artificial neural network, a set of codeword embedding vectors corresponding to the set of message embedding vectors; generating, using the set of codeword embedding vectors, a set of codeword sub-vectors, wherein the set of codeword sub-vectors is permutation equivariant relative to the set of message sub-vectors; combining the set of codeword sub-vectors to generate a codeword vector; and transmitting a communication carrying the codeword vector.

Aspect 2: The method of Aspect 1, wherein generating the set of message embedding vectors further comprises generating the set of message embedding vectors using a common input linear layer.

Aspect 3: The method of any of Aspects 1-2, wherein generating the set of codeword sub-vectors further comprises generating the set of codeword sub-vectors using a common output linear layer.

Aspect 4: The method of any of Aspects 1-3, wherein the artificial neural network consists of the set of self-attention layers.

Aspect 5: The method of any of Aspects 1-4, wherein the artificial neural network is a permutation-equivariant artificial neural network.

Aspect 6: The method of any of Aspects 1-5, further comprising normalizing the codeword vector in accordance with a target transmit power parameter.

Aspect 7: The method of any of Aspects 1-6, further comprising scaling a transmit power parameter of the codeword vector.

Aspect 8: The method of any of Aspects 1-7, further comprising receiving, prior to obtaining the message vector, information indicating a set of model parameters for the artificial neural network, wherein generating the set of codeword embedding vectors is in accordance with the information indicating the set of model parameters.

Aspect 9: The method of Aspect 8, wherein the set of model parameters indicates at least one of a set of weights or a set of biases.

Aspect 10: The method of Aspect 8, wherein the set of model parameters is associated with a number of bits of a message payload of the message vector.

Aspect 11: The method of any of Aspects 1-10, further comprising receiving, prior to obtaining the message vector, a set of message parameters, wherein the set of message parameters indicates, for the message payload, at least one of: a number of padding values, a message sub-vector, of the set of message sub-vectors, that is to contain the number of padding values, or a number of message sub-vectors in the set of message sub-vectors.

Aspect 12: The method of any of Aspects 1-11, wherein the set of message parameters is associated with a number of bits of a message payload of the message vector.

Aspect 13: The method of any of Aspects 1-12, wherein generating the set of message sub-vectors further comprises adding a padding value to one or more message sub-vectors of the set of message sub-vectors.

Aspect 14: The method of any of Aspects 1-13, further comprising converting a bit value of the message vector to a modified value prior to generating the set of message embedding vectors.

Aspect 15: The method of any of Aspects 1-14, wherein the set of codeword sub-vectors is permutation equivariant relative to the set of message sub-vectors such that, for a given permutation of the set of message sub-vectors, the set of codeword sub-vectors is arranged in accordance with the given permutation.

Aspect 16: The method of Aspect 15, wherein the set of codeword sub-vectors is permutation equivariant relative to the set of message sub-vectors for all permutations of the set of message sub-vectors.

Aspect 17: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-16.

Aspect 18: An apparatus for wireless communication at a device, the apparatus comprising one or more memories and one or more processors coupled to the one or more memories, the one or more processors configured to cause the device to perform the method of one or more of Aspects 1-16.

Aspect 19: An apparatus for wireless communication, the apparatus comprising at least one means for performing the method of one or more of Aspects 1-16.

Aspect 20: A non-transitory computer-readable medium storing code for wireless communication, the code comprising instructions executable by one or more processors to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

Aspect 22: A device for wireless communication, the device comprising a processing system that includes one or more processors and one or more memories coupled with the one or more processors, the processing system configured to cause the device to perform the method of one or more of Aspects 1-16.

Aspect 23: An apparatus for wireless communication at a device, the apparatus comprising one or more memories and one or more processors coupled to the one or more memories, the one or more processors individually or collectively configured to cause the device to perform the method of one or more of Aspects 1-16.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A wireless communication device, comprising:
- a processing system that includes one or more processors and one or more memories coupled with the one or more processors, the processing system configured to cause the wireless communication device to:
  - obtain a message vector;
  - generate a set of message sub-vectors using the message vector;
  - generate, using a common input linear layer, a set of message embedding vectors corresponding to the set of message sub-vectors;
  - generate, using a set of self-attention layers of an artificial neural network, a set of codeword embedding vectors corresponding to the set of message embedding vectors;
  - generate, using the set of codeword embedding vectors, a set of codeword sub-vectors, wherein the set of codeword sub-vectors is permutation equivariant relative to the set of message sub-vectors;
  - combine the set of codeword sub-vectors to generate a codeword vector; and
  - transmit a communication carrying the codeword vector.

2. The wireless communication device of claim 1, wherein, to cause the wireless communication device to generate the set of codeword sub-vectors, the processing system is configured to cause the wireless communication device to generate the set of codeword sub-vectors using a common output linear layer.

3. The wireless communication device of claim 1, wherein the artificial neural network consists of the set of self-attention layers.

4. The wireless communication device of claim 1, wherein the artificial neural network is a permutation-equivariant artificial neural network.

5. The wireless communication device of claim 1, wherein the processing system is further configured to cause the wireless communication device to normalize the codeword vector in accordance with a target transmit power parameter.

6. The wireless communication device of claim 1, wherein the processing system is further configured to cause the wireless communication device to scale a transmit power parameter of the codeword vector.

7. The wireless communication device of claim 1, wherein the processing system is further configured to cause the wireless communication device to receive, prior to obtaining the message vector, information indicating a set of model parameters for the artificial neural network,
- wherein the set of codeword embedding vectors is in accordance with the information indicating the set of model parameters.

8. The wireless communication device of claim 7, wherein the set of model parameters indicates at least one of a set of weights or a set of biases.

9. The wireless communication device of claim 7, wherein the set of model parameters is associated with a number of bits of a message payload of the message vector.

10. The wireless communication device of claim 9, wherein the processing system is further configured to cause the wireless communication device to receive, prior to obtaining the message vector, a set of message parameters, wherein the set of message parameters indicates, for the message payload, at least one of:
- a number of padding values,
- a message sub-vector, of the set of message sub-vectors, that is to contain the number of padding values, or
- a number of message sub-vectors in the set of message sub-vectors.

11. The wireless communication device of claim 10, wherein the set of message parameters is associated with a number of bits of a message payload of the message vector.

12. The wireless communication device of claim 1, wherein, to cause the wireless communication device to generate the set of message sub-vectors, the processing system is configured to cause the wireless communication device to add a padding value to one or more message sub-vectors of the set of message sub-vectors.

13. The wireless communication device of claim 1, wherein the processing system is further configured to cause the wireless communication device to convert a bit value of the message vector to a modified value prior to generating the set of message embedding vectors.

14. The wireless communication device of claim 1, wherein the set of codeword sub-vectors is permutation equivariant relative to the set of message sub-vectors such that, for a given permutation of the set of message sub-vectors, the set of codeword sub-vectors is arranged in accordance with the given permutation.

15. The wireless communication device of claim 14, wherein the set of codeword sub-vectors is permutation equivariant relative to the set of message sub-vectors for all permutations of the set of message sub-vectors.

16. A method of wireless communication by a wireless communication device, comprising:

obtaining a message vector;

generating a set of message sub-vectors using the message vector;

generating, using a common input linear layer, a set of message embedding vectors corresponding to the set of message sub-vectors;

generating, using a set of self-attention layers of an artificial neural network, a set of codeword embedding vectors corresponding to the set of message embedding vectors;

generating, using the set of codeword embedding vectors, a set of codeword sub-vectors, wherein the set of codeword sub-vectors is permutation equivariant relative to the set of message sub-vectors;

combining the set of codeword sub-vectors to generate a codeword vector; and transmitting a communication carrying the codeword vector.

17. The method of claim 16, wherein the artificial neural network consists of the set of self-attention layers.

18. The method of claim 16, wherein the artificial neural network is a permutation-equivariant artificial neural network.

19. The method of claim 16, wherein the set of codeword sub-vectors is permutation equivariant relative to the set of message sub-vectors such that, for a given permutation of the set of message sub-vectors, the set of codeword sub-vectors is arranged in accordance with the given permutation.

20. A non-transitory computer-readable medium storing a set of instructions for wireless communication, the set of instructions comprising:

one or more instructions that, when executed by one or more processors of a wireless communication device, cause the wireless communication device to:

obtain a message vector;

generate a set of message sub-vectors using the message vector;

generate, using a common input linear layer, a set of message embedding vectors corresponding to the set of message sub-vectors;

generate, using a set of self-attention layers of an artificial neural network, a set of codeword embedding vectors corresponding to the set of message embedding vectors;

generate, using the set of codeword embedding vectors, a set of codeword sub-vectors, wherein the set of codeword sub-vectors is permutation equivariant relative to the set of message sub-vectors;

combine the set of codeword sub-vectors to generate a codeword vector; and transmit a communication carrying the codeword vector.

* * * * *